US010322342B2

(12) United States Patent
Fukazawa et al.

(10) Patent No.: US 10,322,342 B2
(45) Date of Patent: Jun. 18, 2019

(54) NON-TRANSITORY COMPUTER-READABLE MEDIUM STORING GAME PROGRAM, CONTROL METHOD OF COMPUTER, INFORMATION PROCESSING APPARATUS, IMAGE OUTPUT APPARATUS, IMAGE OUTPUT METHOD, AND NON-TRANSITORY COMPUTER-READABLE MEDIUM STORING IMAGE OUTPUT PROGRAM

(71) Applicant: Tyffon Inc., Santa Monica, CA (US)

(72) Inventors: Takeshi Fukazawa, Tokyo (JP); Teruyuki Nakahashi, Urayasu (JP)

(73) Assignee: Tyffon Inc., Santa Monica, CA (US)

( * ) Notice: Subject to any disclaimer, the term of this patent is extended or adjusted under 35 U.S.C. 154(b) by 610 days.

(21) Appl. No.: 14/927,635

(22) Filed: Oct. 30, 2015

(65) Prior Publication Data

US 2016/0121215 A1 May 5, 2016

(30) Foreign Application Priority Data

Oct. 31, 2014 (JP) ................................. 2014-222775

(51) Int. Cl.
*A63F 13/52* (2014.01)
*A63F 13/213* (2014.01)
(Continued)

(52) U.S. Cl.
CPC ............ *A63F 13/52* (2014.09); *A63F 13/213* (2014.09); *A63F 13/216* (2014.09); *A63F 13/655* (2014.09)

(58) Field of Classification Search
CPC ....................................................... A63F 13/52
See application file for complete search history.

(56) References Cited

U.S. PATENT DOCUMENTS 8,797,260 B2 * 8/2014 Mao ........................ A63F 13/06
345/156
8,819,117 B2 * 8/2014 Moriwaki ......... G06F 17/30241
358/1.15
(Continued)

FOREIGN PATENT DOCUMENTS

JP 2002-183743 A 6/2002
JP 2010-512850 4/2010
(Continued)

OTHER PUBLICATIONS

Notification of Reasons for Refusal dated Oct. 2, 2018, from counterpart Japanese Patent Application No. 2014-222775.
(Continued)

*Primary Examiner* — Ryan R Yang
(74) *Attorney, Agent, or Firm* — DLA Piper LLP (US)

(57) ABSTRACT

Provided is an image output device including image acquisition means for acquiring an image related to a subject captured by a user, position information acquisition means for acquiring position information indicating a position where the image is captured, generation means for generating a landscape image in which an image based on the image acquired by the image acquisition means is superimposed on an image obtained by capturing the landscape, when displaying the image obtained by capturing the landscape of position information acquired by the position information acquisition means, and image output means for outputting the landscape image.

10 Claims, 9 Drawing Sheets

(51) Int. Cl.
*A63F 13/216* (2014.01)
*A63F 13/655* (2014.01)

(56) References Cited

U.S. PATENT DOCUMENTS

| | | | | |
|---|---|---|---|---|
| 9,213,675 | B1* | 12/2015 | Kolton | H04W 4/21 |
| 2006/0116186 | A1* | 6/2006 | Sawada | A63F 13/10 |
| | | | | 463/4 |
| 2012/0092367 | A1* | 4/2012 | Suzuki | G06T 19/006 |
| | | | | 345/632 |
| 2016/0035140 | A1* | 2/2016 | Bickerstaff | A63F 13/26 |
| | | | | 345/633 |
| 2016/0196570 | A1* | 7/2016 | Weingarden | G06Q 30/0214 |
| | | | | 705/14.16 |
| 2016/0337630 | A1* | 11/2016 | Raghoebardajal | ............. |
| | | | | H04N 5/23238 |
| 2016/0366392 | A1* | 12/2016 | Raghoebardajal | H04N 19/132 |
| 2017/0113142 | A1* | 4/2017 | Miyamae et al. | A63F 13/655 |

FOREIGN PATENT DOCUMENTS

| | | |
|---|---|---|
| JP | 2010-128709 | 6/2010 |
| JP | 2013-059541 | 4/2013 |
| JP | 2014-087657 A | 5/2014 |
| JP | 2014-155564 | 8/2014 |

OTHER PUBLICATIONS

Notice of Reasons for Refusal dated Apr. 16, 2019, of counterpart Japanese Application No. 2014-222775, along with an English translation.

* cited by examiner

| USER IDENTIFIER | USER IMAGE | POSITION INFORMATION (LONGITUDE, LATITUDE) | PLACEMENT CHARACTER |
|---|---|---|---|
| ... | ... | ... | ... |
| USER A | 1siuee98.jpg | 35.681266, 139.766091 | CHARACTER A |
| USER B | siX9iisop.jpg | 35.681283, 139.766092 | CHARACTER B |
| USER C | jkiine88.giff | 35.916873, 139.686208 | CHARACTER C |
| USER D | kazuma001.png | 35.242419, 139.547744 | CHARACTER D |
| ⋮ | ⋮ | ⋮ | ⋮ |

NON-TRANSITORY COMPUTER-READABLE MEDIUM STORING GAME PROGRAM, CONTROL METHOD OF COMPUTER, INFORMATION PROCESSING APPARATUS, IMAGE OUTPUT APPARATUS, IMAGE OUTPUT METHOD, AND NON-TRANSITORY COMPUTER-READABLE MEDIUM STORING IMAGE OUTPUT PROGRAM

BACKGROUND OF THE INVENTION

Field of the Invention

The present invention relates to a game program for processing the progress of a game, an image output apparatus that outputs an image, and the like.

Background Art

In recent years, various types of web sites have been published, with the spread of social network services (SNS). Among the web sites, many web sites utilize images that users have uploaded.

For example, Japanese Unexamined Patent Application Publication No. 2002-183743 discloses an information system that generates information containing an uploaded image incorporated in a scenario, by incorporating the image that has been uploaded from a client to a server in a scenario.

Further, a technique has been disclosed in which a user uploads an image to a server, the image being generated by a user in a terminal, and the image is utilized as an avatar in a game (for example, Japanese Unexamined Patent Application Publication No. 2014-087657).

SUMMARY OF THE INVENTION

However, there is a desire to make the user feel an affinity for a game, and to increase an interest of the user for a game, in an information system and a game, which use an image that the user has uploaded as described above.

The present invention has been made in view of the desire, and an object of the present invention is to provide a game program that raises interest for a game, and an image output device by which the user enjoys the image that the user has uploaded with more interest, in a game or an image output device using the image that the user has uploaded.

In order to solve the above problem, a game program according to an aspect of the present invention is a game program that generates a game screen displaying one or more game characters on a game field, and causes a computer to implement an image acquisition function of acquiring an image related to a subject captured by a user, a position information acquisition function of acquiring position information indicating a position where the image is captured, an association function of associating position information acquired by the position information acquisition function with a position on the game field, a placement function of placing a game character of an image based on the image acquired by the image acquisition function, in the position on the game field associated by the association function, a movement processing function of executing a movement process of a user character of the user, based on an operation by the user, a generation function of generating a game screen on which the game character is moved according to a predetermined algorithm, when the user character reaches a position to fit the position on the game field associated with the position information in sight, and an output function of outputting the game screen on a display screen of a display medium by which the user views the image, the user operating the user character.

In order to solve the above problem, a game control method according to another aspect of the present invention is a control method of a computer that executes a process of a game that generates a game screen displaying one or more game characters on a game field, and includes an image acquisition step of acquiring an image related to a subject captured by a user, a position information acquisition step of acquiring position information indicating a position where the image is captured, an association step of associating position information acquired in the position information acquisition step with a position on the game field, a placement step of placing a game character of an image based on the image acquired in the image acquisition step, in the position on the game field associated in the association step, a movement processing step of executing a movement process of a user character of the user, based on an operation by the user, a generation step of generating a game screen on which the game character is moved according to a predetermined algorithm, when the user character reaches a position to fit the position on the game field associated with the position information in sight, and an output step of outputting the game screen on a display screen of a display medium by which the user views the image, the user operating the user character.

In order to solve the above problem, an information processing apparatus according to a still another aspect of the present invention is an information processing apparatus that executes a process of a game that generates a game screen displaying one or more game characters on a game field, and includes image acquisition means for acquiring an image related to a subject captured by a user, position information acquisition means for acquiring position information indicating a position where the image is captured, association means for associating position information acquired by the position information acquisition means with a position on the game field, placement means for placing a game character of an image based on the image acquired by the image acquisition means, in the position on the game field associated by the association means, movement processing means for executing a movement process of a user character of the user, based on an operation by the user, generation means for generating a game screen on which the game character is moved according to a predetermined algorithm, when the user character reaches a position to fit the position on the game field associated with the position information in sight, and output means for outputting the game screen on a display screen of a display medium by which the user views the image, the user operating the user character.

In order to solve the above problem, an image output device according to a still another aspect of the present invention includes image acquisition means for acquiring an image related to a subject captured by a user, position information acquisition means for acquiring position information indicating a position where the image is captured, generation means for generating a landscape image in which an image based on the image acquired by the image acquisition means is superimposed on an image obtained by capturing the landscape, when displaying the image obtained by capturing the landscape of position information acquired by the position information acquisition means, and image output means for outputting the landscape image.

In a game program, a game control method, and a computer according to an embodiment of the present invention, a game character of an image based on an image uploaded by the user is disposed on a game field. Therefore, the affinity of the user for the game is increased, and an interest of the user for the game is improved by disposing the game character based on the image that the user has uploaded, in the game.

DETAILED DESCRIPTION OF THE INVENTION

Figure 1:
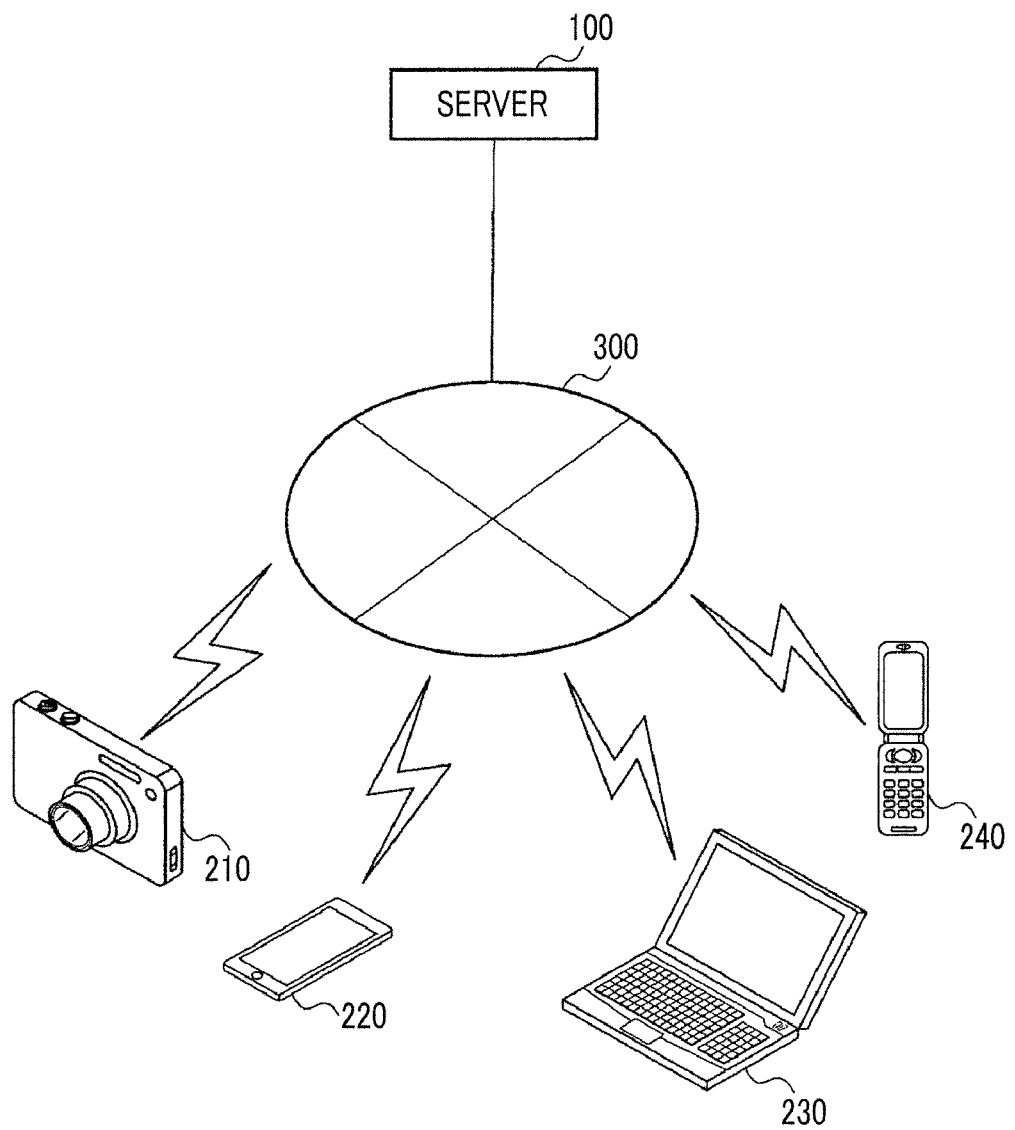
FIG. 1 is a system diagram according to Embodiment 1.

Hereinafter, an embodiment of a game program and an information processing apparatus according to the present invention will be described with reference to the drawings. Embodiment A game program according to the present invention is a game program that generates a game screen displaying one or more game characters on a game field, and causes a computer to implement an image acquisition function, a position information acquisition function, an association function, a placement function, a movement processing function, a generation function, and an output function.

The image acquisition function acquires an image related to a subject captured by a user. An image may be acquired by receiving the image that the user transmits to the computer, or by the computer accessing a recording medium having an image stored therein. An image may be acquired by receiving the image that the user transmits to a computer, or may be acquired by a computer accessing a recording medium storing the image therein. Further, the image related to a subject may be a picture of the subject itself, or an image obtained by applying any processing on the captured image.

The position information acquisition function acquires information capable of specifying a position where the image is captured. The position information may be, for example, information capable of specifying roughly some position (for example, the name of a building, the name of a town, and the name of a street), information on longitude and latitude that are acquired by GPS, and the like.

The association function associates the acquired position information with the position on the game field. In other words, the real position is fitted to the position on the game field.

The placement function places a game character of an image based on the image acquired by the image acquisition function, in the associated position on the game field. The game character of the image based on the image acquired by the image acquisition function is electronic data of a character that is operated by a computer on a game, according to a predetermined algorithm, and the image based on the image captured by the user is used for at least a part of the display image of the game character. Various parameters in the game (for example, a name, physical strength, attack ability, defense ability, speed, a possessed item, and the like) may be set in the game character.

The movement processing function executes a movement process of a user character of the user, based on an operation by the user. The user character is electronic data of a character that can be operated by the user, and various parameters (for example, a name, physical strength, attack ability, defense ability, speed, a possessed item, and the like) may be set therein. The operation by the user may be receiving an input of a controller associated with a computer, or may be realized by receiving operation information from a separate device over a network, that is connected to the computer.

The generation function generates a game screen on which the game character is moved according to a predetermined algorithm, when the user character reaches a position to fit the position on the game field associated with the position information in sight.

The output function outputs the game screen on a display screen of a display medium by which the user views the image, the user operating the user character. The display screen may be provided in the computer, or may be connected to a computer over a network. Further, the output of an image may only be output of pixel data of an image representing an image that needs to be displayed.

Further, in the game program, the image acquisition function acquires a processed image that is obtained by processing the image of the subject that is captured by the user, as the image related to the subject. In other words, the image related to the subject may be any image as long as it is based on the subject, regardless of whether the image is processes or not processed.

Further, the game program causes the computer to implement a processing function of processing the image acquired by the image acquisition function. Then, the placement function places a game character based on the image processed by the processing function.

Further, the game program causes the computer to implement a determination function and a grant function.

The determination function determines whether or not the position acquired by the position information acquisition function is within a specific range.

The grant function grants a specific item on the game, to a user character of the user who captures the image, when the determination function has a positive determination.

Further, the game program causes the computer to implement an acquisition function.

The acquisition function causes the user character to acquire a specific item, when the game is a battle game, and the game character placed in a specific position is subdued. Through the acquisition, the specific item becomes a possessed item of user character.

Further, an image output device according to the present invention includes image acquisition means, position information acquisition means, generation means, and image output means.

The image acquisition means acquires the image related to a subject captured by the user.

The position information acquisition means acquires position information indicating a position where the image is captured.

The generation means generates a landscape image in which an image based on the image acquired by the image acquisition means is superimposed on an image obtained by capturing the landscape, when displaying the image obtained by capturing the landscape of position information acquired by the position information acquisition means.

The image output means outputs the generated landscape image. Here, the outputting may display the landscape image on a recording medium provided in the image output device, and may transmit the image data of the landscape image on an external display medium connected to the image output device.

Further, the generation means further generates a map image, and when generating a map image including a position indicated by position information, the generation means may generate the map image on which an image based on the image acquired by the image acquisition means is superimposed in association with the position based on the position information associated with the image. The image output means may further output the generated map image.

Further, the image output device may further include processing means for processing the image acquired by the image acquisition means, and in this case, the generation means may generate an image in which the image processed by the processing means is superimposed on an image obtained by capturing the landscape.

Further, the image output device may further includes determination means and grant means.

The determination means determines whether or not position information acquired by the position information acquisition means is within a specific range.

The grant means grants a reward to a user who captures the image, when the determination means has a positive determination.

Hereinafter, the details will be described.

Overview

A game program according to the present embodiment is a type of what is called a web browser game.

In other words, the game program is a type of game in which the user accesses a server by using an information processing terminal such as a PC or a smart phone, views an image provided by the server, determines an action in the game, and plays a game. Then, the image that the user has uploaded is used in the game.

Thus, as illustrated in FIG. 1, the user accesses the server by using a digital camera 210, a smart phone 220, a PC 230, and a mobile phone 240, through a network 300, and transmits images that the user has captured by using the respective terminal devices to the server 100. Here, the image that the user has uploaded is basically an image obtained by capturing the user, and may be the captured image as it is, or a processed image obtained by applying a certain processing on the captured image.

The server 100 that is an information processing apparatus is a game server that provides games, and displays an uploaded image that the user has uploaded or a processed image on a map in the game. In this case, the server 100 places the uploaded image or the processed image in a position corresponding to a location where the user has uploaded the image or the location where the user has captured the image.

Therefore, since the image that the user has uploaded and a game character that is generated based on the uploaded image are placed in a location having a relationship with the user, such as the location where the user has uploaded the image or the location where the user has captured the image, it is possible to increase the user's affinity for the game, and raise interest for the game.

Configuration

Figure 2:
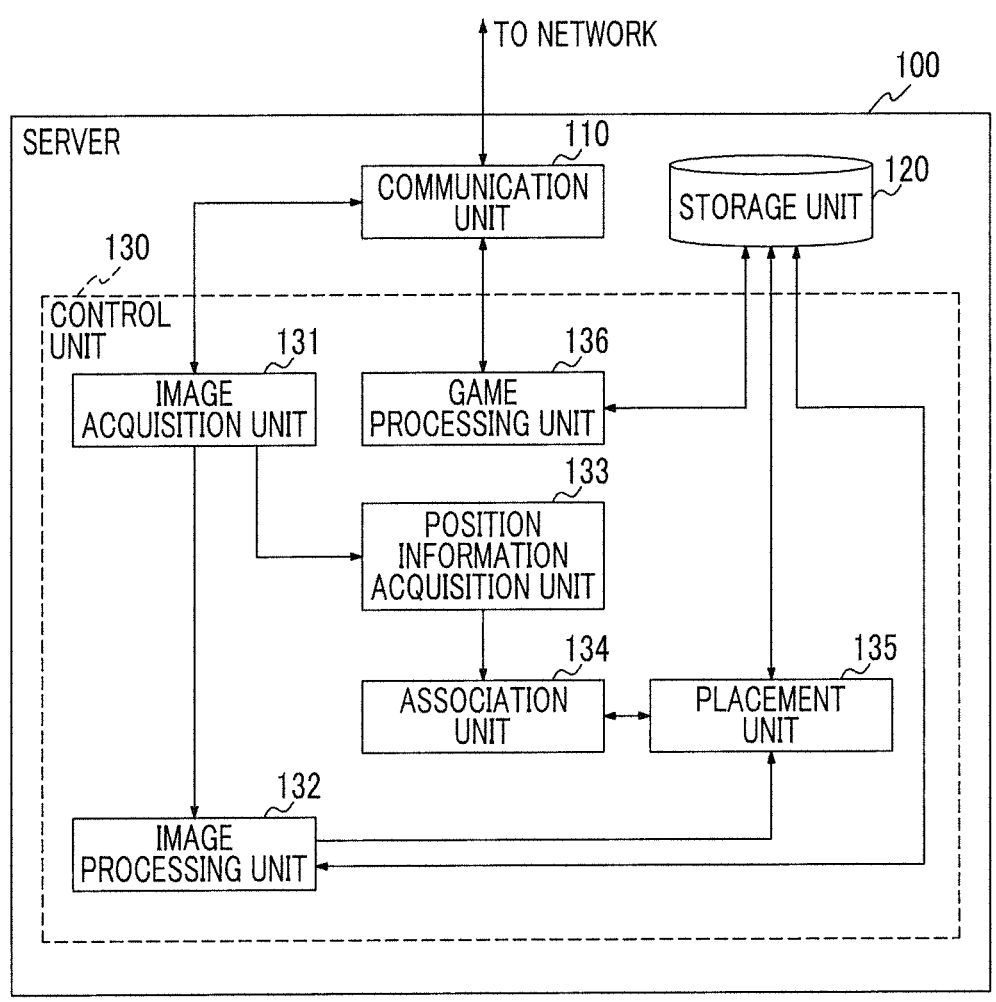
FIG. 2 is a block diagram illustrating a functional configuration example of a server according to Embodiment 1.

FIG. 2 is a block diagram illustrating a functional configuration example of the server 100.

As illustrated in FIG. 2, the server 100 includes a communication unit 110, a storage unit 120, and a control unit 130.

The communication unit 110 has a function of executing communication with various types of devices that are connected to the network 300, through the network 300. The communication counterparts of the server 100 may have a function of executing communication regardless of a wireless manner or a wired manner, and for example, include a digital camera, a smartphone, a PC, a mobile phone, and the like, as illustrated in FIG. 1. The communication unit 110 transmits the uploaded images that are received from various types of devices through a network to the control unit 130. Further, the communication unit 110 transmits the received display data related to the game from the control unit 130, to a device that accesses the server 200 and plays the game.

The storage unit 120 has a function of storing various types of programs and data required in terms of the operation of the server 100. The storage unit 120 may have a function of storing information, and for example, can be realized by various recording media such as a hard disc drive (HDD), a solid state drive (SSD), and a flash memory. The storage unit 120 stores the following types of data.

(1) Image data of data by which the image processing unit 132 processes an image (image data of each part of a face in a case of processing a face image, image data of unavailable parts (for example, the ears or the horns of animals), image data of a body added to the face image, algorithms for executing a process of transforming an image (for example, transformation of narrowing or rounding the face), and the like).

(2) Uploaded images and images that have been processed by the image processing unit 132

(3) Map images used in the game (4) Landscape images used as a background in the game (street view images)

(5) Information on the users who play the game (for example, the user's account information on the game (the user's ID and password), information on the character associated with the user, which is used by the user)

(6) Placement information 300 indicating the uploaded image and the placement location. The details of the placement information 300 will be described later.

(7) Reward information 400 that defines the reward to be given to the user on the game. The details of the reward information 400 will be described later.

(8) Game program main body and various data used in the game

The control unit 130 is a processor having a function of controlling respective parts of the server 100, and a function of executing the process of a game related to the present embodiment.

The control unit 130 includes an image acquisition unit 131, an image processing unit 132, an association unit 134, a placement unit 135, and a game processing unit 136.

The image acquisition unit 131 has a function of acquiring the image that the user has uploaded, which is received through the communication unit 110. The uploaded image may be either a picture itself captured by the hand of the user, or the image that the user has processed as the picture by itself, and in either case, it is assumed that position information is added to the uploaded image. Here, the uploaded image is assumed as a face image. The position information is information indicating a place where the user captures the image or a place where the user uploads the image, and information on longitude and latitude that the user acquires in each place by using a global positioning system (GPS) provided in any device (for example, a mobile phone, a smart phone, a digital camera, and the like). Further, it is assumed that the user performs user registration (registration of personal information of the user such as a user ID (Identifier), a user password, and a name) to the server 100 in order to upload the image, and the user can upload the image in a state where the user logs into the server 100. Therefore, it is assumed that the user ID can be acquired when acquiring the uploaded image.

If the uploaded image is acquired, the image acquisition unit 131 transmits the acquired uploaded image to the image processing unit 132 and the position information acquisition unit 133.

The image processing unit 132 has a function of receiving a user identifier and the uploaded image from the image acquisition unit 131, and performing the processing of the uploaded image. Further, the image processing unit 132 has a function of transmitting the user ID associated with the uploaded image and the processed image after processing to the placement unit 135.

Here, there are two patterns in the processing of the image that is performed by the image processing unit 132.

First, as a first pattern, there is a case of processing the uploaded image itself. As a second pattern, there is a case of adding a body to a face image (an uploaded image or a processed imaged obtained by processing the uploaded image) and generating a game character (a non-player character (NPC) operated by the game processing unit 136).

In the case of the first pattern, the uploaded image is subjected to an image analysis process and classified into each part such as an eye, a nose, a mouth, an ear, and a contour. Each part is transformed, has a change in color, or is replaced with another part which is stored in the storage unit 120. The change parameters in the case may be selected appropriately and randomly, or may be processed according to a predetermined algorithm. An existing technique may be applied for the processing technology of the face image.

In the case of the second pattern, since the uploaded image or the image obtained by processing the uploaded image is the face image, the image processing unit 132 performs a process of adding a body to the face image. In this case, the image processing unit 132 selects a body image to be added to the face image as appropriate, from among the various types of body images that have been stored in the storage unit 120 so as to generate a human image in which the body image is added to the face image. Then, the image processing unit 132 determines and associates an operation algorithm for operating the generated human image to generate a placement character (game character). A plurality of the operation algorithms, are previously stored, and a predetermined operation algorithm is selected based on a predetermined standard and randomly from among them.

When the uploaded image from the user is not yet processed, the image processing unit 132 may perform the process of both the first pattern and the second pattern. When the uploaded image has already been processed, the image processing unit 132 performs the processing of only the pattern 2. Whether the uploaded image is not yet processed or has already been processed may be determined by the user selecting whether or not to execute the processing of the image at the time of uploading, or may be determined by the image processing unit 132 through image analysis. An existing image analysis technique may be employed as the image analysis, and the details will be omitted.

The position information acquisition unit 133 has a function of extracting the position information included in the uploaded image that is transmitted from the image acquisition unit 131. The position information acquisition unit 133 transmits the user ID associated with the uploaded image and the extracted position information to the association unit 134.

The association unit 134 has a function of associating the position information that has been transmitted from the position information acquisition unit 133 with the position information in the game field (also referred to as a map) used in the game. The association unit 134 stores the position information that has been transmitted from the position information acquisition unit 133, and a conversion coefficient for conversion to the position information of the game filed, and converts the transmitted position information to the position information in the game by using the conversion coefficient. Hereinafter, the position information that has been given to the uploaded image is referred to as real position information, and the position information on the game is referred to as game position information. Here, it is assumed that the real position information and the game position information correspond one to one for simplicity of explanation. The association unit 134 transmits the game position information and the user ID to the placement unit 135.

The placement unit 135 has a function of registering the uploaded image that has been transmitted from the image processing unit 132 or the image obtained by processing the uploaded image, the game character that is generated by adding the body to the uploaded image, the user ID that has been transmitted from the association unit 134, and the game position information, in association with each other, in the placement information 300 that is stored in the storage unit 120.

The game processing unit 136 has a function of executing progression of the game according to the present embodiment. The game processing unit 135 executes the game while referring to the game program main body stored in the storage unit 120 and various types of data relating to the game. The game is progressed by using the user character that is generated by the user, and a three-dimensional (3D) image (may be a 2D image) of the first person view point of the user character is displayed on the game screen that the user plays. Further, the background (street view) displayed as the 3D image is an image obtained by capturing the real world, or a 3D digital image obtained by copying the captured image. Various parameters (for example, HP indicating the strength of a character, mental strength for using the skills and magic, attack ability, defense ability, speed, durability, available special abilities, attributes, and the like) are set in characters appearing in the game (the user character and game characters) and items, and the processing of the game (for example, movement of the character, and a process based on the behavior of the character (for example, a battle process)) is executed by the game processing unit 136 by using the parameters. Further, the game has a map display function. If the function is selected by the user, a plan view of a map centered on the place where the user character exists at that time is basically displayed; and if the game character that is included in the placement information 300 exists in the map, the game character is displayed as a pop-up image in a place where the user image is arranged as a thumbnail image. The range of the map to be displayed is not intended to be centered on the user character, and the range selected by the user may be displayed.

The game processing unit 136 acquires the operation content by the user through the communication unit 110, determines the action of the user character, and generates the landscape image in the action direction. In this case, the game processing unit 136 determines whether or not there is a placement character (game character) present in a position to fit in sight based on the game position information at that time of the user character, by referring to the placement information 300. When there is the placement character, the game processing unit 136 reads information on the placement character, places the placement character so as to be superimposed on the generated landscape image, and transmits the image data that is generated while the placement character moves according to the operation algorithm that is set in the placement character, by a device by which the user plays the game, through the communication unit 110. Incidentally, the determination is performed as to whether or not there is a placement character in a position to fit in sight, for example, by determining whether or not the placement character is placed within a predetermined distance from the starting point of a predetermined angle (view angle) to the left or right of the center of the traveling direction, starting from the position information of the user character.

Further, when a new placement character is registered in the placement information 300, the game processing unit 136 reads the user ID and the game position information. The game processing unit 136 refers to the reward information 400 stored in the storage unit 120. It is determined whether or not the read game position information is included in the range recorded in the reward information 400. When it is determined that the game position information is included, the game processing unit 136 specifies the corresponding gift item, and gives the specified gift item to the user character corresponding to the user ID.

The above is the configuration of the server 100 according to the present embodiment.

Data

Figure 3:
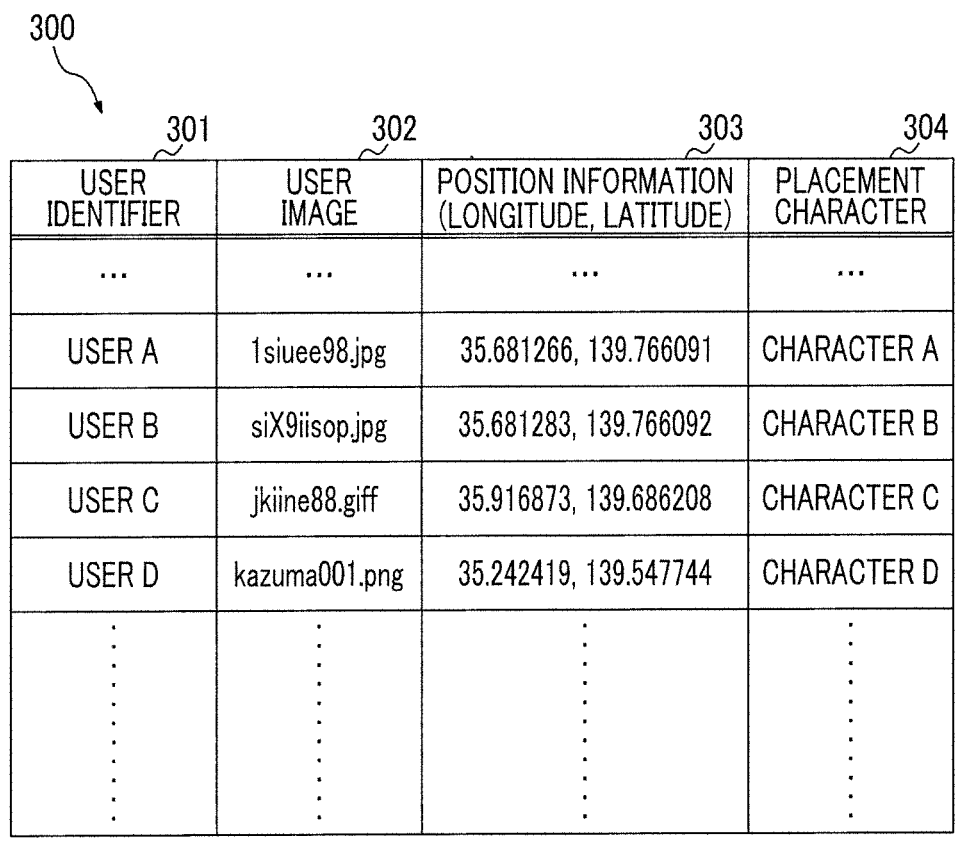
FIG. 3 is a data conceptual diagram of placement information illustrating association between position information and image data.

FIG. 3 is a data conceptual diagram illustrating a data configuration example of the placement information 300 used for managing the image that the user has uploaded.

As illustrated in FIG. 3, the placement information 300 is information in which a user identifier 301, a user image 302, position information 303, and a placement character 304 are included.

The user identifier 301 is an identifier for specifying a user who has uploaded an image. Further, in the present embodiment, the user identifier 301 is also the user ID of the user who plays a game, at the same time.

The user image 302 is information indicating an identifier of the image data (a face image and a human image) used on the game, which is generated based on the image that the user has uploaded. The image data main body is stored in a separate storage unit 120. FIG. 3 illustrates an example in which only one user image is associated with each user, but a plurality of user images may be associated, and game position information and a placement character may be associated with each user character.

The position information 303 is information indicating a position on the game in which the game character generated by the image processing unit 132 is to be used, and is represented by longitude and latitude. In the present embodiment, the position information corresponds to actual position information.

The placement character 304 is information indicating a game character based on the uploaded image from the user, which is generated by the image processing unit 132. Here, information by which the game character can be identified is described, but the actual data is stored in the storage unit 120, the actual data includes a game character generated by the image processing unit 132.

Since there is the placement information 300, the game processing unit 136 can generate the display data for placing and displaying the game character generated based on the uploaded image from the user, as is appropriate.

Figure 4:
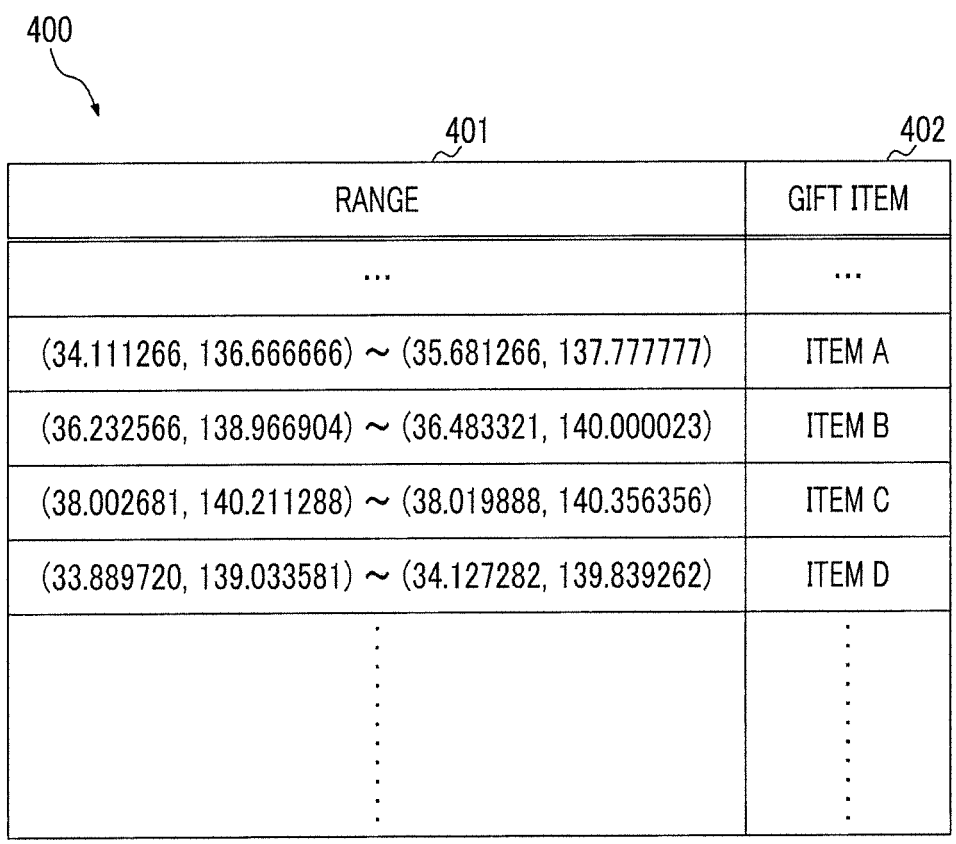
FIG. 4 is a data conceptual diagram of reward information illustrating a relationship between a range and a gift item given based on the range.

FIG. 4 is a data conceptual diagram illustrating a data configuration example of the reward information 400 used for determining whether to give a reward to the user character, in the game, when the user has uploaded an image.

As illustrated in FIG. 4, the reward information 400 is information in which a range 401 and a gift item 402 are associated.

The range 401 indicates a predetermined range of the game position information, and is expressed in the form of (X1, Y1) to (X2, Y2). X1 and X2 represent the longitudes, and Y1 and Y2 represent the latitudes. The range expressed by (X1, Y1) to (X2, Y2) indicates a region surrounded by four points (X1, Y1), (X2, Y1), (X1, Y2), and (X2, Y2).

When the position information given to the image that the user has uploaded is within a range indicated by the range 401, the gift item 402 indicates an item on the game to be given to the user character of the user. The item may be any kind of thing, but if the item is a game item that is not obtained only by uploading the image that has been captured at that location or uploading the image at that location, it is possible to raise an interest for the game. Further, for example, it is possible to further improve the affinity and interest of the user for the game, by setting items with features closely related to a region for the gift item. Alternatively, a contract is made with stores of some kind of brands, and the item may be items on the games of the brands. In that case, a store-limited item may be given by providing a store on the game field at the same position as the position where there is an actual store, and capturing and uploading an image in the actual store.

Operation

The server 100 according to the present embodiment has a function of executing two processes to which roughly classified. In other words, (I) a process of generating and registering a game character based on the image uploaded from the user, and (II) an actual game process. Hereinafter, first, the operation according to the generation of the game character will be described with reference to FIG. 5, and thereafter, the operation according to the game process will be described with reference to FIG. 6.

Figure 5:
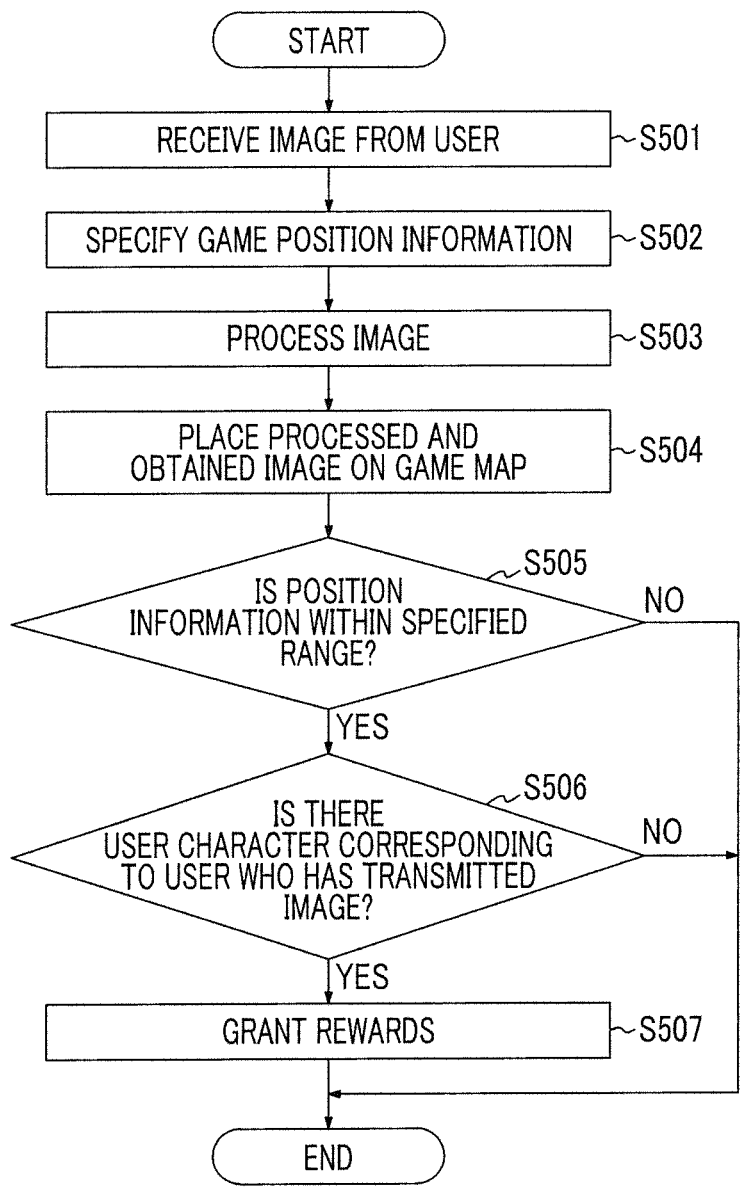
FIG. 5 is a flow chart illustrating an operation example of the server when receiving the uploaded image according to Embodiment 1.

FIG. 5 is a flow chart illustrating an operation example of the server 100 generating a placement character based on the uploaded image.

As illustrated in FIG. 5, the communication unit 110 of the server 100 receives an uploaded image from the user through the network 300 (step S501). The image acquisition unit 131 acquires the received uploaded image. The image acquisition unit 131 transmits the acquired uploaded image to the position information acquisition unit 133 and the image processing unit 132.

The position information acquisition unit 133 extracts real position information contained in the uploaded image, and transmits the extracted real position information and the user ID to the association unit 134. The association unit 134 converts the real position information into game position information according to the stored conversion coefficient. Thus, a position, in which a placement character (game character) based on the uploaded image is to be placed, is specified (step S502). The association unit 134 transmits game position information and a user ID to the placement unit 135.

If the uploaded image is transmitted, the image processing unit 132 processes the uploaded image. Specifically, the image processing unit 132 processes the uploaded image as it is, if necessary. Further, the image processing unit 132 adds a body to the uploaded image or the processed uploaded image, and generates a placement character (game character) associated with the selected operation algorithm (step S503). The image processing unit 132 transmits the uploaded image or the processed uploaded image, and information on the placement character to the placement unit 135.

The placement unit 135 registers the user ID and the game position information that are transmitted from the association unit 134, and the uploaded image or the processed uploaded image, and the information on the placement character that are transmitted from the image processing unit 132, in the placement information 300 stored in a storage unit 120, in association with each other (step S504). Accordingly, when a game is actually played, if there is a user character similar to the game position information, the registered placement character is displayed in sight (screen) by the game processing unit 136.

If a new placement character is registered to the placement information 300, the game processing unit 136 reads game position information 303 associated with the placement character. Then, it is determined whether or not the new placement character is within any of the ranges 401 registered to the reward information 400, using the read game position information 303 (step S505).

When it is determined that the placement character is included (YES in step S505), the game processing unit 136 determines whether or not the user character indicated by the user ID corresponding to the placement character is registered in the game (step S506).

Then, when the user character is registered (YES in step S506), the game processing unit 136 gives a gift item corresponding to a range including the game position information, to the user character (adds the gift item to items possessed by the user character), and ends the process.

When the game position information is not included in any range indicated by the reward information 400 (NO in step S505), or there is no user character corresponding to the user ID (NO in step S506), the game processing unit 136 ends the process without giving the item.

Figure 6:
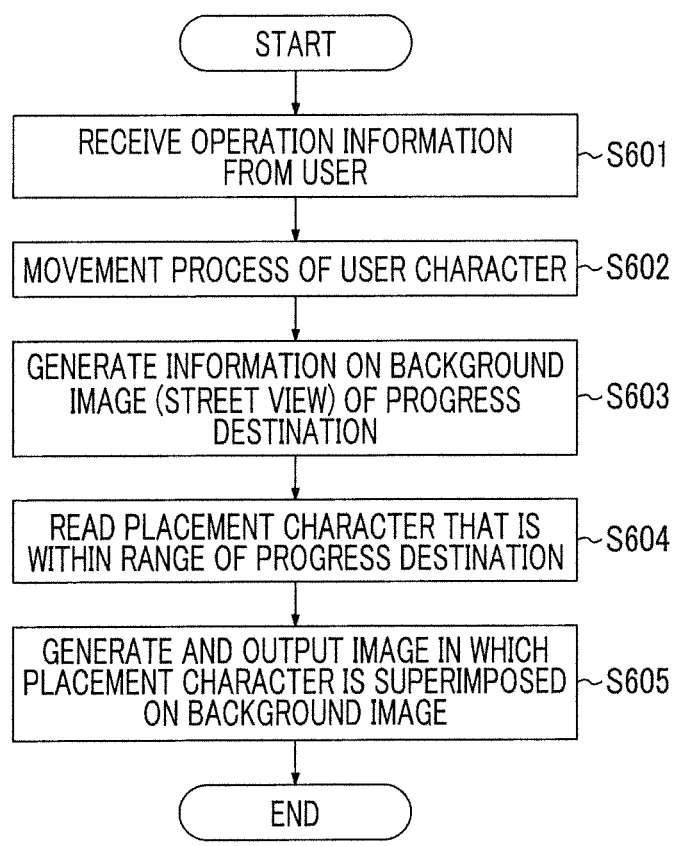
FIG. 6 is a flowchart illustrating an operation example of the server in an actual game process.

FIG. 6 is a flowchart illustrating an operation when the server 100 executes a process related to a game, when a user accesses the server 100 by using an information processing apparatus such as a PC and plays a game, and illustrating an operation when outputting the image of the game.

As illustrated in FIG. 6, the communication unit 110 of the server 100 receives operation information according to the operation by the user character from a device operated by the user (step S601).

When receiving operation information from the communication unit 110, the game processing unit 136 performs a movement process of the user character, based on the operation information (specifies whether to move the user character towards anywhere on the game field) (step S602).

When specifying a direction in which the user character travels by the movement process, the game processing unit 136 generates a background image (a street view) seen from the viewpoint of the user character towards the specified direction (step S603).

Next, the game processing unit 136 specifies the placement character (game character) included in the placement information 300, in the range of sight, from the position where the user character is located and the specified traveling direction. Then, when there is the placement character to be displayed, data of the placement character is read (step S604).

Then, the game processing unit 136 superimposes the placement character read in step S604 on the background image generated in step S603, and generates and outputs image data that is operated according to an operation algorithm that has been set (step S605). The image data is transmitted to an information processing apparatus that is played by the user, through the communication unit 110.

Thus, if the user character that is operated by the user in the game reaches a location where the uploaded image has been captured or a place where the image has been uploaded, the user can see that the game character generated based on the image uploaded by the user is moving.

In addition, although the process by the information processing apparatus of the user is not particularly described in the present embodiment, the information processing apparatus may include a communication function for accessing the website of the server 100 and transmitting and receiving information relating to a game, a function of receiving an input from the user and transmitting the input to the server 100, and a function of receiving image information relating to the game from the server 100 and displaying the image information, and can be implemented by electronic devices such as PCs and smart phones in the related art. Further, the apparatus may have a function of uploading the image or processing the image. Further, an apparatus by which the user captures an image and uploads the image, and an apparatus by which the user plays a game may be separate apparatuses.

Screen Example

From now, a specific example of a use aspect of the image uploaded by the user will be described.

Figure 7:
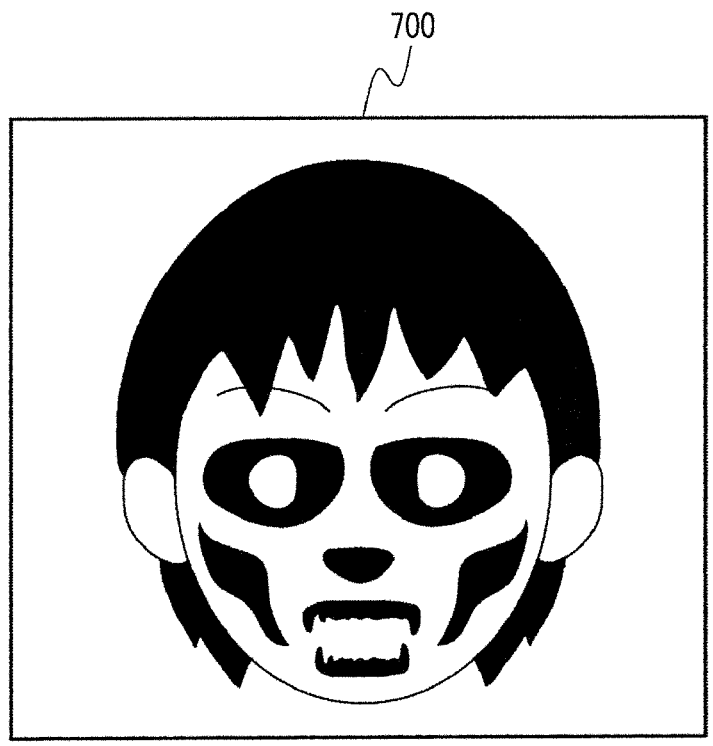
FIG. 7 is an image that the user transmits to the server.

FIG. 7 is a diagram illustrating an image example that the user has uploaded.

As illustrated in FIG. 7, the user may perform some kind of image processing on the image obtained by capturing the user, and upload the processed image. In the example of FIG. 7, the user uploads an image obtained by processing the image obtained by capturing the user so as to look like a zombie.

Incidentally, as described above, the user may directly upload the image obtained by capturing the user, and in this case, the image processing unit 132 of the server 100 uses the uploaded image by performing some kind of image processing on the uploaded image.

Figure 8:
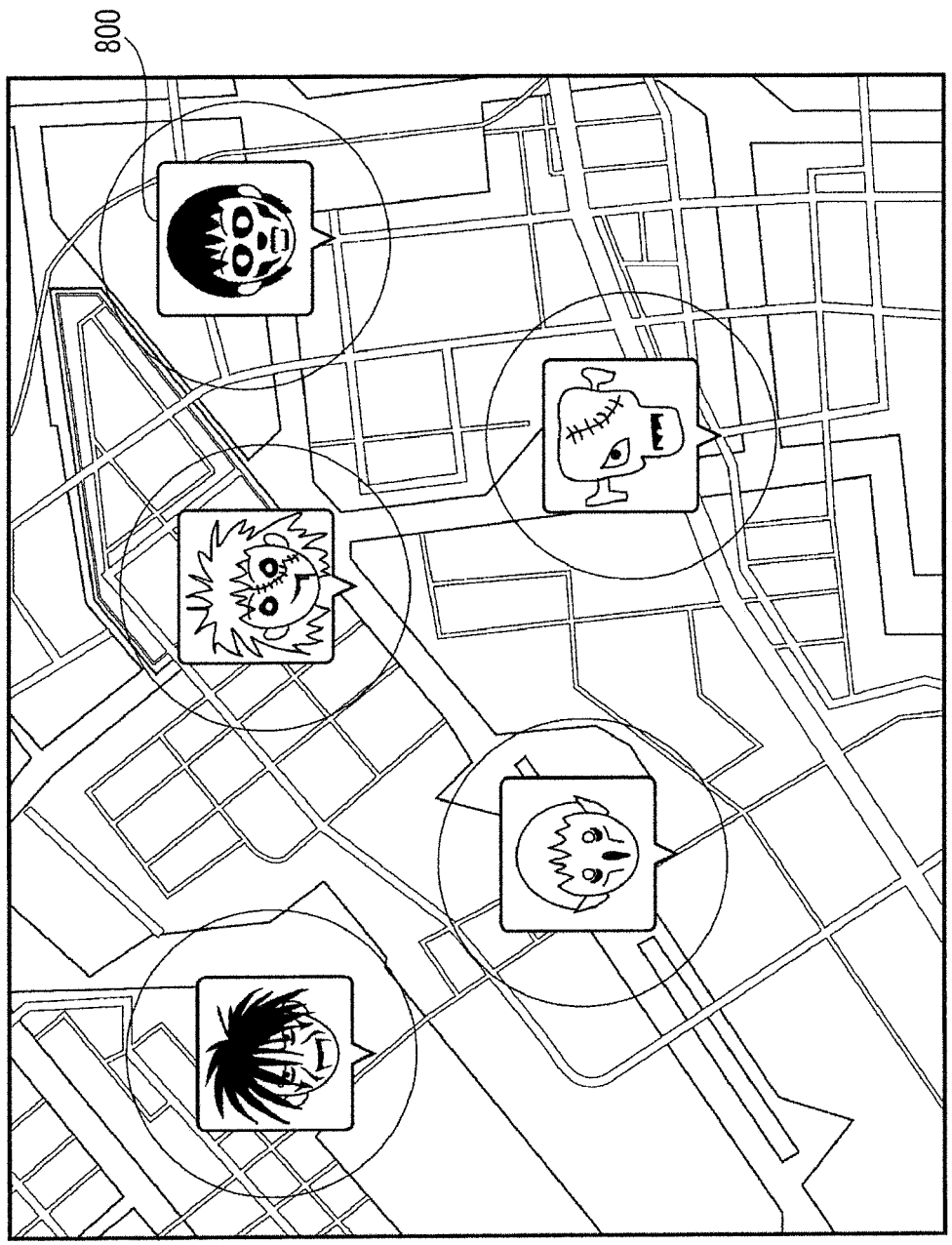
FIG. 8 is a diagram of a screen displaying a map as a game screen example of a game according to the embodiment.

FIG. 8 is an example of a game screen used in a game, which illustrates a plan view of a game map by a map display function of a game. Then, when the position information associated with the image that the user has uploaded is included in a display range of a map, in the map, a thumbnail image of the uploaded image is displayed in a pop-up manner in a position corresponding to the position information. As illustrated in the thumbnail image 800 of FIG. 8, a thumbnail image based on the image that the user has uploaded illustrated in FIG. 7 is displayed in a pop-up manner on the map.

In this manner, since the image that the user has uploaded (or an image processed by the server 100 based on the image that the user has uploaded) is displayed on the map in the game, the user has a sensation of further enhanced affinity and interest for the game.

Figure 9:
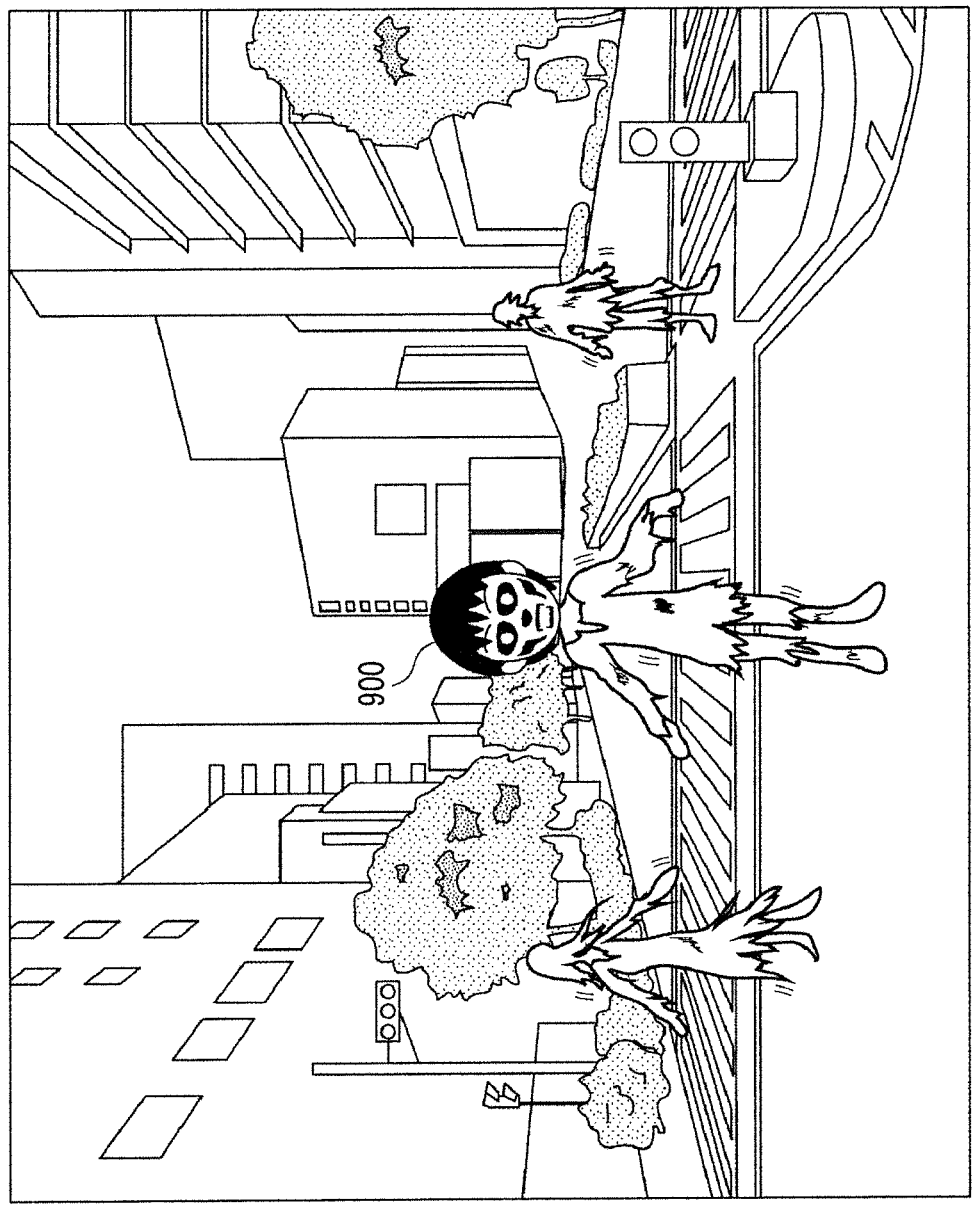
FIG. 9 is a diagram of a screen displaying a street view as a game screen example of the game according to the embodiment.

FIG. 9 is an example of a game screen. FIG. 9 is an example of a street view displayed when operating and moving the user character. Similarly, FIG. 9 is a street view at the position where a thumbnail image 800 based on the uploaded image of the user of FIG. 8 is displayed, and is a display screen example that is displayed when the user character operated by the user in the game reaches close to the position corresponding to the thumbnail image 800 based on the image that the user has uploaded illustrated in FIG. 8.

Since the character based on the image that the user has uploaded is placed in the game according to the present embodiment, when the character of the user in the game has reached the place where the user has actually captured the uploaded image or the position corresponding to the place where the user has uploaded the image, the user can view the character based on the uploaded image. The characters illustrated in FIG. 8 moves according to a predetermined algorithm that has been set by the server 100. For example, if the user character operated by the user approaches the placement character 900, the placement character 900 performs an action to move toward the user, wanders in a certain range, attacks the user character, or speaks to the user, according to an algorithm that has been set. The example of FIG. 9 illustrates a game image in which the placement character 900 of a zombie, generated based on the image that the user has uploaded, wanders.

Therefore, it is possible to increase the affinity and interest of the user for the game.

As described above, the server 100 according to the present embodiment uses the image that the user has uploaded as a face image of the character in the game. The server 100 adds a body to the uploaded image, and places the body-added image in a position in the game, corresponding to the position information included in the uploaded image, as the character. When the user goes to the position by operating the user character, the user can view the game character that is generated based on the image uploaded the user, which can remind the user of the place where the user actually went, and thus it is possible to cause the user to have affinity and interest for the game.

Summary

As described above, in the game program and the server 100 according to the present embodiment, the game character used in the game is generated by using the image uploaded by the user, and is placed in the position in the game, associated with position information on the location where the user has captured the uploaded image, or the location where the user has uploaded the image. Therefore, it is possible to increase user's affinity for the game, and raise interest for the game.

Modification Example

Although the game program and the server according to the present invention have been described in the embodiment, it is needless to say that the spirit of the present invention is not limited thereto. The following describes the various modification examples included as the spirit of the present invention.

(1) In the above embodiment, a game has been described as an example, but the embodiment of the present invention is not limited only to the game. As long as the image that the user has uploaded is displayed in association with the position information, those other than a game may be used.

For example, a map is displayed on the Web site, and as illustrated in FIG. 7, the image that the user has uploaded may be displayed in association with position information of the place where the image has been captured, or position information of the place where the image has been loaded. Further, in this case, if the uploaded image is selected, the street view of the place is displayed, and the image uploaded by the user is displayed on the street view so as to be viewed as if the image moves.

Further, although a reward in the game is given to the user when an image is captured in a specific location or an image is uploaded from a specific location in the embodiment, in the case that is not related to a game, some other kinds of rewards (for example, money, points for using services other than games), or objects (for example, local specialties represented by position information, or the like) may be given. Further, even in the case of a game, rewards that can actually be used may be given.

(2) In the embodiment, the image uploaded by the user is an image that the user himself has captured or a face image obtained by processing the image, but is not limited thereto. As long as the subject is not unnatural when disposed on the landscape image (on the street view), the subject of the uploaded image may be anything, for example, the user's pet, belongings (for example, stuffed animals or the like), a costume character, and the like. Further, if the position information is added to the uploaded image, it may be an image that the user has drawn.

(3) Although it is assumed to use the same map as the actual map as a game map in the embodiment, without being limited thereto, an original map dedicated for a game may be created and used as a game map. In this case, if the server 100 has association information indicating an association relationship between the actual position information and the position in the original map dedicated for a game, the image based on the image that the user has uploaded and the character can be placed on the map in the game similarly to the embodiment. In other words, in this case, the conversion coefficient stored in the association unit 134 is not one-to-one, but another coefficient.

(4) In the embodiment, an item is given to the user, when the user captures an image or uploads an image in a particular place. However, it is also conceivable that the user cannot go to the place due to a far distance, depending on the user who plays the game. For such a user, it may be configured that the user can acquire the item if the user goes to the particular place, and subdues the game character disposed thereon in the game, or clears the condition presented by the disposed game character.

(5) In the embodiment, if the image uploaded by the user or the imaged generated by the image processing unit 132 is an image such as a so-called zombie appearing in a horror movie, it is possible to employ a horror game to subdue zombies as the game in the embodiment.

Further, the above description has been made regarding the case where the uploaded image or the image obtained after processing the uploaded image is a zombie, but without being limited thereto, for example, a process of adding ears of animals, wearing a mask, or making horn may be performed.

(6) In the embodiment, although not particularly described, it may be configured that each information processing apparatus (such as a mobile phone, a smart phone, a PC, and the like) can download the data that is used for processing of the uploaded image by the image processing unit 132, and is stored in the storage unit 120 of the server 100, and the user processes the image by using the data downloaded by each information processing apparatus, and uploads the processed image as the uploaded image to the server 100.

Since the game provider can determine the data that can be downloaded by the configuration, it is possible to bring a sense of unity to the game image to some extent. Therefore, it is possible to prevent the user who actually plays a game from feeling uncomfortable while looking at the game screen.

(7) The game according to the embodiment has been described as a web browser game, but is not limited thereto. Each image that the user has uploaded, or a video that is based on the image may be associated with the location where the user has captured the image or the location where the user has uploaded the image, and may be displayed in the game. In other words, it may be configured that the components such as the image acquisition unit 131, the image processing unit 132, the association unit 134, the placement unit 135, and the game processing unit 136, which are included in the server 100 in the embodiment are implemented as a so-called native application that is implemented in the information processing terminal such as a PC or a smartphone, that the user possesses. In this case, the image processing terminal of the user is configured to receive an uploaded image through the network 300 from another information processing terminal.

Further, a part of the functions that the server 100 has may be configured as a hybrid-type game that is implemented by the information processing terminal of the user. For example, the server 100 may implement the configuration of the image acquisition unit 131, the image processing unit 132, the position information acquisition unit 133, the association unit 145, and the placement unit 135, and the information processing terminal of the user may implement the configuration of the game processing unit 136. In this case, the server 100 transmits the image obtained by processing and the position information (for example, information of a predetermined range where there are user characters) indicating the placement location to each information processing terminal, if necessary so as to implement the game described in the embodiment.

(8) In the embodiment, although not particularly described, the arrangement density of the placement character may be displayed in each predetermined range of the map (in each region, or in each block) in the game map display (see FIG. 8). For example, each region may be represented by a red gradient from the region of lower arrangement density to a region of higher arrangement density. If the map is displayed, the user can know where to go to see a lot of placement characters at a glance in the game. Further, an event (campaign) of giving a specific item to the user may be performed, who has captured and uploaded an image in a thin red region, in other words, a region having a small number of placement characters or the user who has uploaded the image in the game.

(9) In the embodiment, the placement character may be disposed at the position indicated by the game position information, or may be moved from that position within a predetermined range, according to the set operation algorithm. Alternatively, an event (campaign) may be performed which finds a place where the placement character, generated based on the image uploaded by the user, goes on the game may be performed, by purposely moving the placement character away from that position. In this case, information indicating where the placement character went on the game may be inserted (a comment that is a hint of the whereabouts of the game character is left, or data such as a note of the placement character is placed) on the game, and the user who plays the game according to the information searches for the placement character. When the searching is possible, a certain reward may be given.

(10) The game program according to an aspect of the present invention can be implemented in at least the following three configurations. In other words, (a) the game program may be implemented in a configuration in which the computer functions as a client device (for example, a smart phones, a personal computer, or the like), and the game program is executed in the client device, (b) the game program may be implemented in a configuration in which the computer functions as a server device (for example, a mainframe, a cluster computer, any computer capable of providing a game service to an external device, or the like), some or all of the game program is executed in the server device, and the results of the executed process is returned to the client device, and (c) the game program may be implemented in a configuration in which a process that is included in the game program is arbitrarily shared in the client device and server device.

Therefore, the display processing function that is implemented by the game program, (a) may display the game screen on the display device, by outputting information (for example, display information) to an external display device (for example, a display unit provided in a mobile terminal) that is communicably connected to a computer through a predetermined network (for example, the Internet), or (b) may display the game screen on the display device, by outputting display information to the display device.

Further, (a) a client device that is communicably connected to a computer through a predetermined network (for example, the Internet) includes a predetermined input device, the client device transmits the operation information that is input through the predetermined input device to the computer, an operation information acquisition function that is implemented on the computer by the game program acquires the operation information, or (b) the computer includes a predetermined input device, and the operation information acquisition function may acquire the operation information through the predetermined input device.

(11) The respective function units of the information processing apparatus 100 may be implemented by a logic circuit (hardware) formed on an integrated circuit (IC chip) or the like, or may be implemented by software using a central processing unit (CPU). In the latter case, the information processing apparatus 100 or the server device 200 includes a CPU that executes the instructions of the game program that is software for implementing the respective functions, a read only memory (ROM) or a storage (these are referred to as "recording medium") in which the game program and various types of data are recorded in a readable manner by the computer (or the CPU), a random access memory (RAM) that develops the game program, and the like. Then, the object according to the present invention is achieved by the computer (or the CPU) reading the game program from the recording medium and executing it. It is possible to use a "non-temporary medium", for example, a tape, a disk, a card, a semiconductor memory, a programmable logic circuit, and the like, as the recording medium. Further, the game program may be supplied to the computer through a certain transmission medium capable of transmitting the game program (communication networks, broadcast waves, or the like). The present invention may be implemented as a type of data signal embedded in carrier waves in which the game program is embodied by electronic transmission.

Further, the game program can be implemented using, for example, scripting languages such as ActionScript, JavaScript (registered trademark), object-oriented programming languages such as Objective-C, and Java (registered trademark), markup languages such as HTML5, and the like. Further, a game system including an information processing terminal (for example, the information processing apparatus 100) including respective units that implement the respective functions that are implemented by the game program, and a server including respective units that implement remaining functions other than the respective functions also belongs to the scope of the present invention.

(12) While the invention has been described based on various drawings and embodiments, it should be noted that it is easy for the skilled person in the art to make various variations and modifications, based on the present disclosure. Therefore, it should be noted that these variations and modifications are included in the scope of the present invention. For example, function and the like included in each means and each step can be repositioned so as not to be logically inconsistent, and a plurality of means or steps can be combined into one, or divided.

(13) The respective configurations presented in the embodiment and various modification examples may be appropriately combined.

Others

Here, an embodiment of the game program and the information processing apparatus according to the present invention, the contents of each unit, and the effects of the aspect will be described.

(a) A game program according to the present invention is a game program that generates a game screen displaying one or more game characters on a game field, and causes a computer to implement an image acquisition function (the image acquisition unit 131) of acquiring an image related to a subject captured by a user, a position information acquisition function (the position information acquisition unit 133) of acquiring position information indicating a position where the image is captured, an association function (the association unit 134) of associating position information (actual position information) acquired by the position information (game position information) an acquisition function with a position on the game field, a placement function (the placement unit 135) of placing a game character of an image based on the image acquired by the image acquisition function, in the position on the game field associated by the association function, a movement processing function (the game processing unit 136) of executing a movement process of a user character of the user, based on an operation by the user, a generation function (game processing unit 136) of generating a game screen on which the game character is moved according to a predetermined algorithm, when the user character reaches a position to fit the position on the game field associated with the position information in sight, and an output function (the game processing unit 136) of outputting the game screen on a display screen of a display medium by which the user views the image, the user operating the user character.

Here, the user character is a character that can be operated by the user in the game.

Further, the game character is a character to be operated on the game program side, and in general, is a character referred to as a Non Player Character (NPC).

Thus, the game character of an image based on the image that the user has uploaded is placed on the game field. Therefore, the affinity of the user for the game is improved, the game character based on the image that the user has uploaded is placed in the game, and the interest of the user for the game is improved.

(b) In the game program according to (a), the image acquisition function may acquire a processed image that is obtained by processing the image of the subject that is captured by the user, as the image related to the subject.

Thus, since the user uploads a favorite image, and a game character based on the image is placed on a game, the user can further enjoy the game.

(c) The game program according to (a) causes the computer to implement a processing function of processing the image acquired by the image acquisition function, and the placement function may place a game character based on the image processed by the processing function.

Thus, since the processed image is used on the game even if there is no processing technique of an image on the user side, for example, the user does not use the image captured by the user himself as it is, and thus it is possible to enjoy the game by uploading an image with confidence (in terms of that information on himself is not known to many users). Therefore, it is possible to provide a highly reliable game to the user.

(d) In the game program according to (a) to (c), the game program may cause the computer to further implement a determination function of determining whether or not the position acquired by the position information acquisition function is within a specific range, and a grant function of granting a specific item on the game, to a user character of the user who captures the image, when the determination function has a positive determination.

Thus, the user captures or uploads more images here and there, in order to acquire a specific item. Therefore, it is possible improve the versatility of the game by increasing game characters that can be provided on the game side.

(e) In the game program according to (d), the game is a battle game in which the user subdues the game character by using the user character, and the game program further causes the computer to implement an acquisition function of acquiring the specific item, when the determination function has a positive determination and the user character subdues the placed game character.

Thus, it is possible to provide an opportunity to acquire the specific item even if the user actually does not go to the location where a specific item can be acquired, and to provide a user-friendly game.

(f) An information processing apparatus according to the present invention may include image acquisition means (the image acquisition unit 131) of acquiring an image related to a subject captured by a user, position information acquisition means (the position information acquisition unit 133) of acquiring position information indicating a position where the image is captured, generation means (the game processing unit 136) of generating a landscape image in which an image based on an image acquired by the image acquisition means is superimposed on an image obtained by capturing the landscape, when displaying the image obtained by capturing the landscape of position information acquired by the position information acquisition means, and image output means (the game processing unit 136) for outputting the landscape image.

Thus, the user can see the landscape image on which the image uploaded by the user is superimposed, as the landscape image, without going to the location.

(g) In the information processing apparatus according to (f), the generation means further generates a map image, and when generating a map image including a position indicated by position information, the generation means may generate the map image on which an image based on the image acquired by the image acquisition means is superimposed in association with the position, and the image output means may further output the map image.

Thus, while the user checks the location, where the user himself went, on the map image, the user checks the image that was captured at that location, and can enjoy remembering that the user went to the location.

(h) In the game program according to (a), processing means for processing the image acquired by the image acquisition means may be further included, and the generation means may generate an image in which the image processed by the processing means is superimposed on an image obtained by capturing the landscape.

Thus, as long as the landscape image is not only open to the specific user but also open to the public, it is difficult to specify a user who has uploaded an image, thereby improving the confidentiality of personal information of a user.

(i) In the game program according to (a), the determination means for determining whether or not position information acquired by the position information acquisition means is within a specific range and the grant means for granting a reward to a user who captures the image, when the determination means has a positive determination may further be included.

Thus, since the user can obtain some kind of reward in the case of uploading an image captured at a specific location, it is possible to raise the user's feeling to desire to upload the image.

The present invention can be widely applied to any computer such as a smart phone, a tablet terminal, a mobile phone, a home game machine, a personal computer, a server apparatus, a workstation, and a mainframe.

What is claimed is:

1. An image output device that generates a game screen displaying one or more game characters on a game field comprising:
    image acquisition means for acquiring an image related to a subject captured by a user;
    position information acquisition means for acquiring position information indicating a position where the image is captured;
    association means of associating position information acquired by the position information acquisition means with a position on the game field;
    placement means of placing a game character of an image based on the image acquired by the image acquisition means, in the position on the game field associated by the association means;
    image output means for outputting the game screen showing a landscape at a position associated with position information on the game field together with the arranged game character;
    a movement processing means of executing a movement process of a user character of the user; and
    generation means of generating a game screen on which the game character is moved according to a predetermined algorithm, when the user character reaches a position to fit the position on the game field associated with the position information in sight.

2. The image output device according to claim 1,
    wherein the generation means generates a map image, and when generating a map image including a position indicated by position information, the generation means generates the map image on which an image based on the image acquired by the image acquisition means is superimposed in association with the position, and
    wherein the image output means further outputs the map image.

3. The image output device according to claim 1, further comprising:
    processing means in a game program implemented by the image output device for processing the image acquired by the image acquisition means,
    wherein the generation means generates an image in which the image processed by the processing means is superimposed on an image obtained by capturing the landscape.

4. The image output device according to claim 1, further comprising:
    determination means for determining whether or not position information acquired by the position information acquisition means is within a specific range; and
    grant means in a game program implemented by the image output device for granting a reward to a user who captures the image, when the determination means has a positive determination.

5. A non-transitory computer-readable medium storing an image output program generating a game screen displaying one or more game characters on a game field and for executing an image output process causing a computer of an image output device to output an image, the image output process comprising:
    an image acquisition step of acquiring an image related to a subject captured by a user;
    a position information acquisition step of acquiring position information indicating a position where the image is captured;
    an association step associating position information acquired by the position information acquisition step with a position on the game field;
    a placement step of placing a game character of an image based on the image acquired by the image acquisition step, in the position on the game field associated by the association steps;
    an image output step for outputting the game screen showing a landscape at a position associated with position information on the game field together with the arranged game character;
    a movement processing step of executing a movement process of a user character of the user; and
    a generation step of generating a game screen on which the game character is moved according to a predetermined algorithm, when the user character reaches a position to fit the position on the game field associated with the position information in sight.

6. A non-transitory computer-readable medium storing a game program that generates a game screen displaying one or more game characters on a game field, the game program causing a computer to implement:
    an image acquisition function of acquiring an image related to a subject captured by a user;
    a position information acquisition function of acquiring position information indicating a position where the image is captured;
    an association function of associating position information acquired by the position information acquisition function with a position on the game field;
    a placement function of placing a game character of an image based on the image acquired by the image acquisition function, in the position on the game field associated by the association function;

a movement processing function of executing a movement process of a user character of the user, based on an operation by the user;

a generation function of generating a game screen on which the game character is moved according to a predetermined algorithm, when the user character reaches a position to fit the position on the game field associated with the position information in sight; and an output function of outputting the game screen on a display screen of a display medium by which the user views the image, the user operating the user character.

7. A non-transitory computer-readable medium according to claim 6, wherein the image acquisition function acquires a processed image that is obtained by processing the image of the subject that is captured the user, as the image related to the subject.

8. A non-transitory computer-readable medium according to claim 6, further causing the computer to implement a processing function of processing the image acquired by the image acquisition function, wherein the placement function places a game character based on the image processed by the processing function.

9. A non-transitory computer-readable medium according to claim 6, further causing the computer to implement:

a determination function of determining whether or not the position acquired by the position information acquisition function is within a specific range; and a grant function of granting a specific item on the game to a user character of the user who captures the image, when the determination function has a positive determination.

10. A non-transitory computer-readable medium according to claim 9, wherein the game is a battle game in which the user subdues the game character by using the user character, and wherein the game program further causes the computer to implement an acquisition function of acquiring the specific item, when the determination function has a positive determination and the user character subdues the placed game character.

* * * * *